United States Patent [19]

Ricks

[11] 3,867,469
[45] Feb. 18, 1975

[54] OXYCHLORINATION PROCESS
[75] Inventor: Michael James Ricks, Runcorn, England
[73] Assignee: Imperial Chemical Industries Limited, London, England
[22] Filed: Mar. 20, 1972
[21] Appl. No.: 236,197

[30] Foreign Application Priority Data
Apr. 2, 1971 Great Britain .................... 8506/71

[52] U.S. Cl. ............................ 260/659 A, 252/441
[51] Int. Cl. ............................................ C07c 17/02
[58] Field of Search ..................... 260/659 A, 662 A

[56] References Cited
UNITED STATES PATENTS

| 3,114,607 | 12/1963 | Milliken | 423/502 |
| 3,210,431 | 10/1965 | Engel | 260/659 A |
| 3,363,010 | 1/1968 | Schwarzenbek | 260/659 A |

Primary Examiner—Bernard Helfin
Assistant Examiner—Joseph A. Boska
Attorney, Agent, or Firm—Cushman, Darby & Cushman

[57] ABSTRACT

Process of oxychlorinating olefins, especially ethylene, by reacting the olefine, ammonium chloride and molecular oxygen in the presence of an oxychlorination catalyst, especially one containing copper and cesium.

6 Claims, No Drawings

OXYCHLORINATION PROCESS

This invention relates to a process for the oxychlorination of olefines.

It is well known that ethylene can be brought into reaction with molecular oxygen and a source of chlorine in the presence of an oxychlorination catalyst to give mainly 1,2-dichloroethane. The source of chlorine may be hydrogen chloride or a compound such as ammonium chloride which on dissociation provides hydrogen chloride. However, oxychlorination processes based on ammonium chloride are unsatisfactory when conversions of ethylene to 1,2-dichloroethane are poor.

It is possible as is described in our U.K. Pat. No. 1,329,709 to obtain good conversions to chlorinated hydrocarbons based on olefine and chloride by using an excess and preferably a very considerable excess of the stoichiometric ratios of oxygen with respect to olefine and to ammonium chloride. However, such a process has the disadvantage that there is poor recovery of the ammonia liberated by dissociation. Again in our U.K. Pat. No. 1,307,113 it has been proposed to introduce into the reaction zone hydrogen chloride in addition to that provided by dissociation of ammonium chloride. Here again if a large molar ratio of oxygen to other reactants is employed the conversions based on olefine are good but the ammonia recovery is poor, while if stoichiometric ratios of the reactants are employed the conversion is poor but the ammonia recovery is good.

Our most recent studies lead us to believe that a fundamental feature of the process which has not been fully appreciated is the competition for oxygen between the oxychlorination reaction and the reaction involving burning of ammonia. Thus when using the stoichiometric ratios of the reactants in the equation

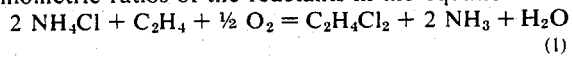

$$2 NH_4Cl + C_2H_4 + \tfrac{1}{2} O_2 = C_2H_4Cl_2 + 2 NH_3 + H_2O \qquad (1)$$

and when using a supported catalyst consisting essentially of copper chloride the ethylene conversion to chlorinated hydrocarbon product (mainly 1,2-dichloroethane) is at best 40 percent with a corresponding ammonia recovery of 80 percent. Under these conditions the sole products of ammonia burning are nitrogen and water according to the equation

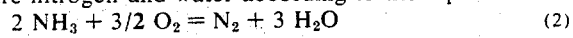

$$2 NH_3 + 3/2 O_2 = N_2 + 3 H_2O \qquad (2)$$

Comparison of these two equations shows that ammonia burning requires three times the amount of oxygen that is required for the oxychlorination reaction. Thus burning of 20 percent of the ammonia in equation (1) utilises 60 percent of the oxygen feed and so conversion of ethylene is limited to a maximum of 40 percent by the availability of oxygen.

It is our present discovery that an improved oxychlorination process involving ammonium chloride, olefine and a source of oxygen is obtained by modifying the supported catalyst so as to shift the competition for available oxygen in favour of oxychlorination of the olefine while reducing the burning of ammonia.

We find that oxychlorination catalysts which have a compound of cesium as an essential component are eminently useful in said oxychlorination process.

According to the present invention, therefore, we provide a process for the oxychlorination of olefines by bringing into reaction an olefine, ammonium chloride and molecular oxygen which is characterised in that the process is carried out in the presence of an oxychlorination catalyst which has associated therewith a compound of cesium.

The present process is particularly suitable for the oxychlorination of aliphatic olefines and especially for the oxychlorination of ethylene.

The oxychlorination catalyst may be any such catalyst known in the art, especially one containing a copper compound, though catalysts containing compounds of other metals (for example iron) may also be used. The compound of cesium is preferably cesium chloride. However any other compound of cesium can be used, if desired. Thus a compound which is converted to the chloride during use (e.g., cesium hydroxide) can be employed. The cesium compound may most conveniently be associated with a copper compound, for example copper chloride. If desired other metal compounds may also be present, for example a compound of at least one of the rare earth metals, for example a compound of neodymium.

The catalyst and associated cesium compound may be conveniently carried on a suitable support, for example silica and/or alumina. The concentration of the catalytically active metals in such supported catalysts need not be high. Good results can be obtained when the concentration of copper (expressed as the element) is, for example 2 percent by weight or less. Preferably not less than 0.5 percent by weight of copper is employed. The proportion of cesium (expressed as the element) is commonly such as to provide approximately equal weights of cesium and of the active metal in the catalyst. Larger or smaller proportions of the cesium compound and/or the compound of the rare earth metal may be used if desired.

In the present process it is preferred to use molar ratios of oxygen to ethylene in the range ½:1 (the stoichiometric ratio) to less than 1:1. It is particularly preferred to use a molar ratio of oxygen to ethylene which is not greater that ¾:1. Preferably also the molar ratios of oxygen to ammonium chloride are in the range ¼:1 to less than ½:1 and in particular less than ⅜:1. Such ratios of oxygen to ethylene and of oxygen to ammonium chloride are employed with a molar ratio of ethylene to ammonium chloride of substantially 1:2, that is, 0.9:2 to 1.1:2. Indeed very useful results are obtained in the present process when employing the stoichiometric ratios of ethylene:ammonium chloride: oxygen of 1:2:0.5. A suitable source of oxygen is air.

Subatmospheric, substantially atmospheric or superatmospheric pressures can be used in the present process. A wide range of temperatures can be employed, the particular temperature being dependent to a considerable extent on the organic reactant used and the reaction conditions. At temperatures below 280°C and at atmospheric pressure there is some danger of there being insufficient sublimation of the ammonium chloride. Good results are obtained in the oxychlorination of ethylene at temperatures in the range 280° to 360°C. Contact times may be varied according to the reaction conditions and are generally in the range 1 to 50 seconds. Especially useful results are obtained in the range 5 to 15 seconds.

The process may be operated utilising a fixed bed but preferably a fluid bed of catalyst is employed.

The ammonium chloride can be introduced into the reactor by any suitable means, e.g. by introducing vaporised ammonium chloride into the reactor, or by passing air over heated ammonium chloride to entrain ammonium chloride in the gaseous stream which then passes into the reactor. However when operating the process of the present invention it is preferred to inject the ammonium chloride either in the liquid state, for example as a slurry, or more preferably in the solid form directly into a fluidised catalyst. On introduction into the heated catalyst zone the ammonium chloride could be regarded before reaction ensues as equivalent to a mixture of ammonia and hydrogen chloride arguably in equilibrium with some undissociated ammonium chloride molecules.

In the oxychlorination of ethylene with hydrogen chloride and a source of oxygen the reaction is strongly exothermic and so intensive internal cooling means are required to control the violence of the reaction. While vaporised ammonium chloride (or the dissociation products of ammonium chloride) can be introduced into the reactor this does require a source of heat external to the reactor and the ammonium chloride plays no significant part in controlling the reaction. However when ammonium chloride is injected into the reactor a better heat balance is achieved in the sense that the heat evolved in the oxychlorination reaction provides to a very considerable extent the heat required to bring the ammonium chloride to reaction temperature and to vaporise and dissociate the ammonium chloride.

In the present process there may also be introduced into the reaction zone hydrogen chloride other than that provided by dissociation of the ammonium chloride, e.g., hydrogen chloride obtained by pyrolysis of 1,2-dichloroethane product. In this case the molar ratio of oxygen is calculated with respect to total moles of ammonium chloride and hydrogen chloride. However there is an increase in ammonia burning while maintaining the same oxygen flow when using a mixed feed of ammonium chloride and hydrogen chloride.

The invention includes within its scope a catalyst composition comprising an oxychlorination catalyst associated with a compound of cesium. A catalyst composition comprising a compound of copper and a compound of cesium is preferred. Optionally a compound of at least one of the rare earth metals may be present in the catalyst composition. Such compositions are eminently suitable for use in the present process.

The following Examples illustrate but do not limit the invention:

EXAMPLE 1

The apparatus comprised a vertical, heat-resistant glass tube 75 cm long and 5 cm internal diameter widening at its upper end to provide a disengagement zone. The tube contained 600 ml of an oxychlorination catalyst. The catalysts all contained the metals specified (including cesium) as chlorides and were carried on a α-alumina support of surface area 7 $m^2/g$ manufactured by Alcoa Industries (U.S.A). The catalyst composition is given in Table 1 as percent of metal by weight of the final supported catalyst.

Through a side arm at the bottom of the tube and through a sinter were passed oxygen, hydrogen chloride and helium. Ammonia and ethylene were passed through a tube which itself passed downwardly and centrally through the reaction tube and terminated just above the sinster. The feeds were 6 l/hr ethylene, 12 l/hr ammonium chloride (this was in the form of 12 l/hr ammonia and 12 l/hr hydrogen chloride), 3 l/hr oxygen and 50 l/hr helium. The contact time was 13 seconds. The helium simplified analysis of the product by gas chromatography. The catalyst was maintained in the fluidised state. Details of the runs and the results obtained are given in Table 1.

Table 1

| Run | Temp °C | Catalyst | $C_2H_4$ conversion to 1,2-dichloro-ethane % | $C_2H_4$ conversion to chlorinated hydrocarbons | $NH_3$ recovery % | $C_2H_4$ burned to $CO_2$ % |
|---|---|---|---|---|---|---|
| 1 | 311 | Cs 2% ) Cu 2% ) | 51 | 54 | 92 | 0 |
| 2 | 307 | Cs 2% ) Cu 0.5% ) Nd 3% ) | 61 | 64 | 89 | 0.6 |
| 3 | 309 | Cs 2% ) Cu 2% ) Nd 1% ) | 58 | 59 | 84 | 0.2 |

Comparison

By way of comparison runs were carried out with other oxychlorination catalysts not containing cesium.

Table 2

| Run | Temp °C | Catalyst | $C_2H_4$ conversion to 1,2-dichloro-ethane % | $C_2H_4$ conversion to chlorinated hydrocarbons | $NH_3$ recovery % | $C_2H_4$ burned to $CO_2$ % |
|---|---|---|---|---|---|---|
| 4 | 306 | Cu 5% | 23 | 24 | 93 | 0 |
| 5 | 306 | Cu 5% ) K 2% ) | 22 | 23 | 93 | 0.1 |
| 6 | 303 | Cu 5% ) Na 0.7% ) | 18 | 19 | 87 | 1.8 |
| 7 | 304 | Cu 5% ) Li 0.2% ) | 34 | 35 | 87 | 0 |
| 8 | 310 | Cu 5% ) K 2% ) Nd 2% ) | 37 | 39 | 94 | 1.2 |

In runs 6 and 7 the loading of sodium and lithium is not as small as appears but merely reflects the low atomic weights of these elements as compared with that of cesium.

It is obvious from Table 1 and Comparative Table 2 that catalysts having cesium as a component show much improved conversions of ethylene than do those not having cesium as a component.

EXAMPLE 2

The procedure of Example 1 was repeated using the catalyst of run 1 except that there was employed 6 l/hr ammonium chloride and an additional 6 l/hr hydrogen chloride. The conversions to chlorinated hydrocarbons (selectivity to 1,2-dichloroethane 97 percent) based on ethylene and chloride were 57 and 59 percent respectively. The ammonia recovery was 86 percent and ethylene burned to $CO_2$ was 0.7 percent.

What we claim is:

1. In a process for the oxychlorination of olefines by bringing into reaction an olefine, ammonium chloride and molecular oxygen the improvement comprising carrying out the reaction at a temperature of 280° to 360°C in the presence of a supported oxychlorination catalyst comprising a chloride of copper and a chloride of cesium.

2. A process as claimed in claim 1 in which a compound of at least one of the rare earth metals is associated with the oxychlorination catalyst.

3. A process as claimed in claim 2 in which the compound of at least one of the rare earth metals is a chloride.

4. A process as claimed in claim 3 in which the concentrations of copper and of cesium are both in the range 0.5 to 2 percent by weight of the supported catalyst.

5. A process as claimed in claim 1 in which there is employed a molar ratio of oxygen to ethylene of from ½:1 to less than 1:1 and a molar ratio of oxygen to ammonium chloride of ¼:1 to less than ½:1, the molar ratio of ethylene to ammonium chloride being in the range 0.9:2 to 1.1:2.

6. A process as claimed in claim 5 in which there is employed a molar ratio of oxygen to ethylene of from ½:1 to less than ¾:1 and a molar ratio of oxygen to ammonium chloride of from ¼:1 to less than ⅜:1.

* * * * *